United States Patent
Huang et al.

(10) Patent No.: US 11,540,197 B2
(45) Date of Patent: Dec. 27, 2022

(54) SYSTEMS AND METHODS FOR NETWORK BASED DYNAMIC NETWORK SLICE SELECTION CONTROL AND FEDERATION

(71) Applicant: Verizon Patent and Licensing Inc., Basking Ridge, NJ (US)

(72) Inventors: Ye Huang, San Ramon, CA (US); Miguel A. Carames, Long Valley, NJ (US); Sudhakar Reddy Patil, Flower Mound, TX (US); Alexander Fadeev, Summit, NJ (US); Suzann Hua, Beverly Hills, CA (US); Jude M. Munn, Bay Point, CA (US); Michael R. Waters, Staten Island, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 17/319,359

(22) Filed: May 13, 2021

(65) Prior Publication Data
US 2022/0369199 A1    Nov. 17, 2022

(51) Int. Cl.
*H04W 40/02* (2009.01)

(52) U.S. Cl.
CPC .................................. *H04W 40/02* (2013.01)

(58) Field of Classification Search
CPC ..................................................... H04W 40/02
See application file for complete search history.

(56) References Cited

U.S. PATENT DOCUMENTS

| | | | |
|---|---|---|---|
| 2021/0352534 A1* | 11/2021 | Tiwari | H04W 28/24 |
| 2022/0210669 A1* | 6/2022 | Yu | H04W 4/50 |

* cited by examiner

*Primary Examiner* — Marisol Figueroa

(57) ABSTRACT

In some implementations, a network device may receive an identifier associated with an application server. The network device may associate the identifier with a service profile associated with a network slice based on a quality of service associated with the network slice. The network device may provide, to a device associated with the application server, information indicating that the identifier is associated with the service profile. The network device may receive address information associated with the application server. The network device may associate the address information with the service profile. The network device may provide service profile information to a security device included in a core network to cause the security device to forward traffic transmitted by the application server toward a destination via the network slice. The service profile information may include an identifier associated with the service profile, the identifier, and the address information.

20 Claims, 12 Drawing Sheets

Service Profile Table

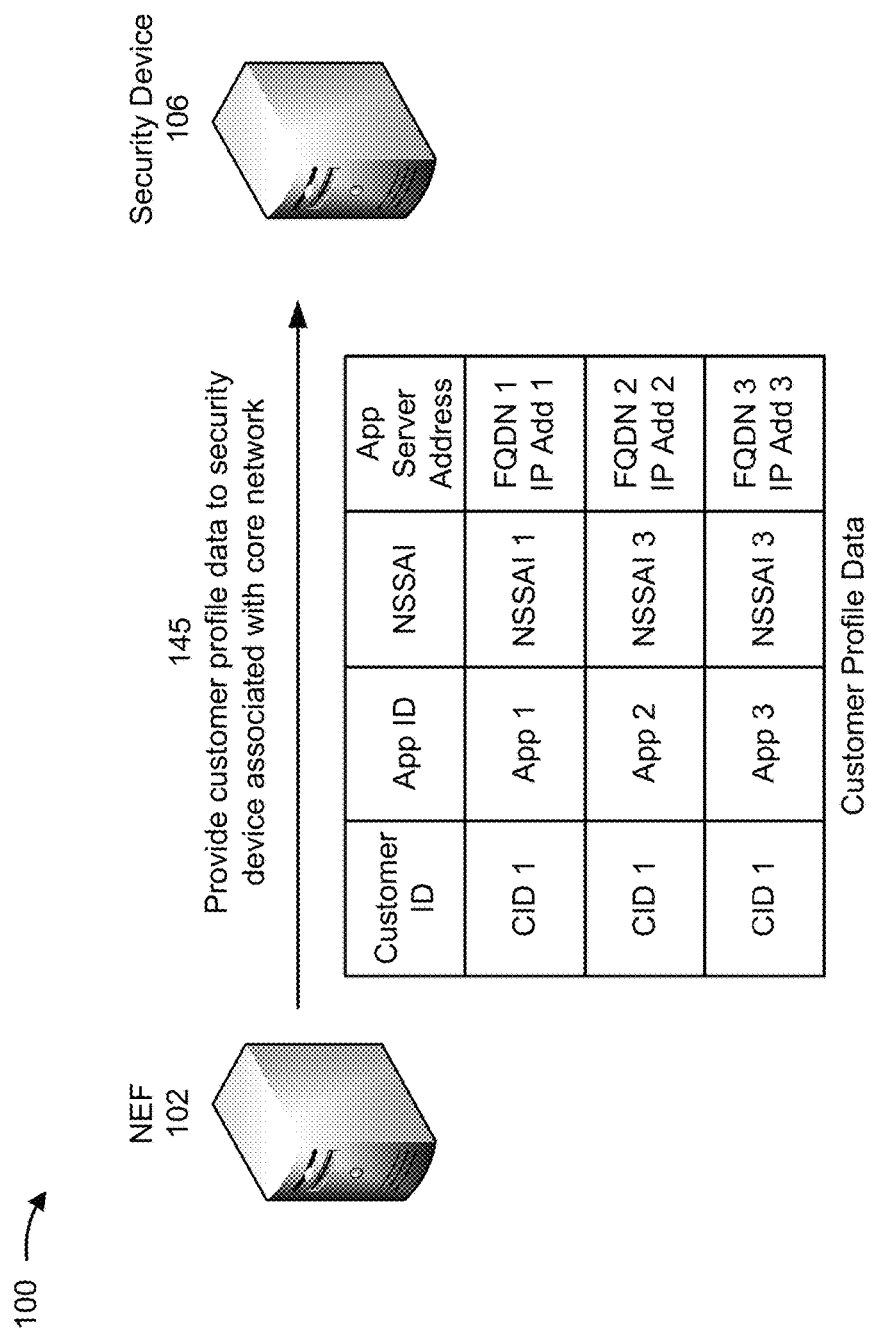

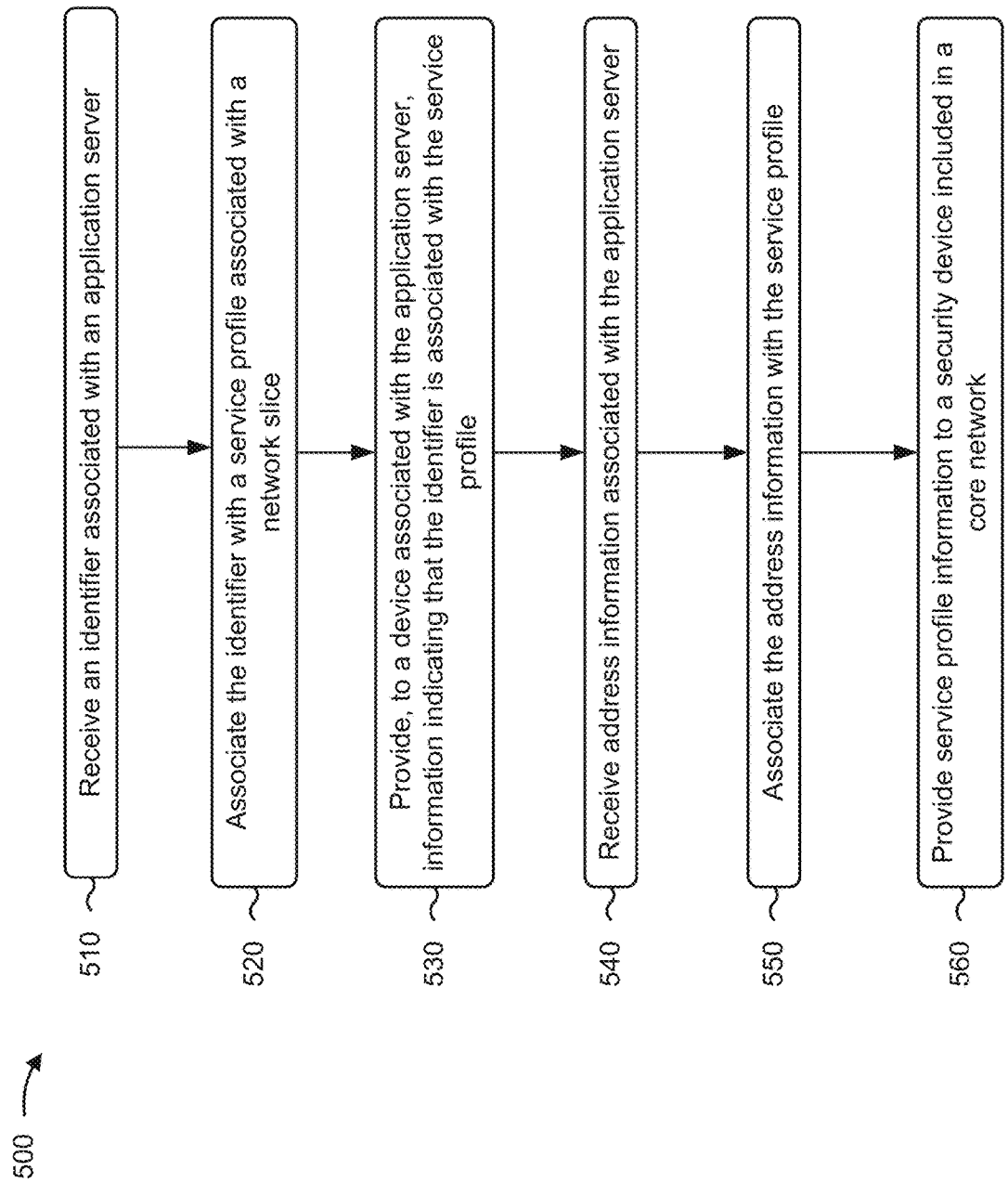

SYSTEMS AND METHODS FOR NETWORK BASED DYNAMIC NETWORK SLICE SELECTION CONTROL AND FEDERATION

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

BRIEF DESCRIPTION OF THE DRAWINGS

FIGS. 1A-1H are diagrams of an example associated with network based dynamic slice selection control and federation.

FIG. 5 is a flowchart of an example process relating to network based dynamic slice selection control and federation.

DETAILED DESCRIPTION OF PREFERRED EMBODIMENTS

Figure 1A:
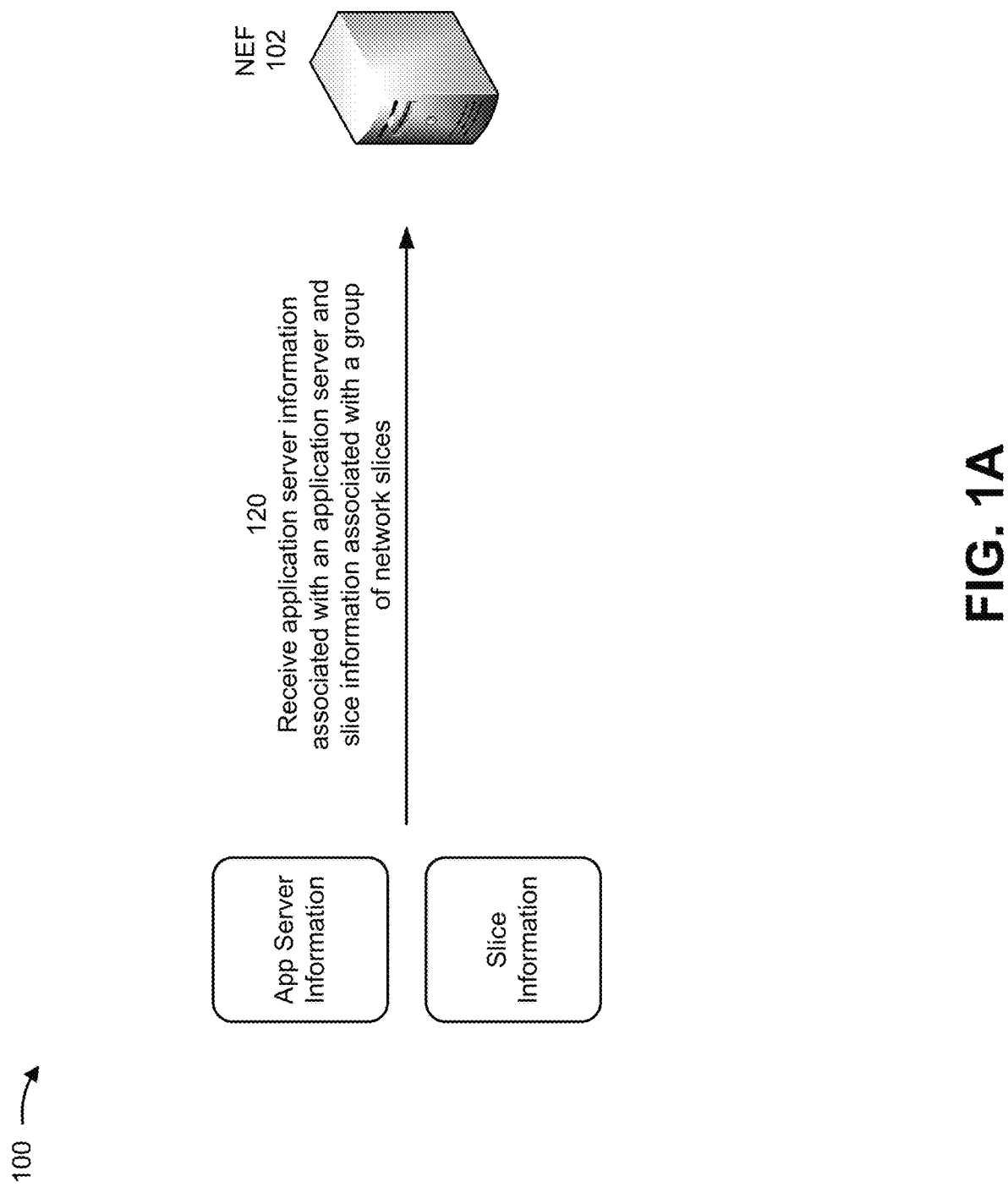

The following detailed description of example implementations refers to the accompanying drawings. The same reference numbers in different drawings may identify the same or similar elements.

In a wireless telecommunications system (which can be referred to herein as "the system"), such as a 5G wireless telecommunications network, network slicing allows for multiple virtual networks to run on a single physical network to support multiple services, applications, and/or entities (e.g., end users, customers, such as organizations that provide a service to end users of the wireless telecommunications systems, and/or the like). In some instances, when a user equipment (UE) requests a connection (e.g., protocol data unit (PDU) connectivity) to the network for an application and/or service, the UE provides the network with information associated with the UE, the application, and/or the service. Such information can include network slice selection assistance information (NSSAI), which can include a collection or list of individual, single-network slice selection assistance information (S-NSSAI) (which can be referred to herein individually as "S-NSSAI" or collectively as "5-NSSAIs") that identify respective network slices associated with the UE.

In some cases, a service provider of the network may provide NSSAI to a vendor. The NSSAI may include S-NSSAI associated with network slices configured to provide differentiated service (e.g., a default level of service, a premium level of service, and/or the like). The vendor may provide the S-NSSAI to UEs associated with customers subscribed to a service provided by the vendor. By providing different S-NSSAIs to a UE based on a subscription to which a user associated with the UE is subscribed, an application being accessed, and/or the like, the vendor may provide differentiated service to the UEs by causing different application traffic flows to be routed to different network slices associated with different levels of service.

However, by providing NSSAI to a vendor, the vendor may be able to determine a network topology of the network, which may create a security risk for the network. Further, to change a mapping of an application to a network slice, the service provider may be required to provide updated NSSAI to one or more vendors. Similarly, the one or more vendors may need to provide updated S-NSSAIs to one or more UEs.

Additionally, although providing the NSSAI to a UE may enable a service provider to ensure uplink traffic from the UE to an application server is routed to a network slice associated with a particular level of service, the service provider may not be able to control the level of service provided to downlink traffic transmitted by the application server to the UE. For example, because the vendor is provided NSSAI associated with multiple levels of service, the vendor is able to control which NSSAI is utilized by the application server thereby allowing the vendor to control the level of service provided to the downlink traffic.

Some implementations described herein enable network based dynamic slice selection control and federation. For example, a network exposure function (NEF) included in a core network of a service provider may receive an identifier associated with an application server of a vendor. The NEF may determine a level of service associated with the application server based on the identifier. For example, the NEF may utilize the identifier to access a data structure (e.g., a database, a table, a list, and/or the like) storing information mapping identifiers to levels of service subscribed to by entities (e.g., vendors, businesses, individuals, and/or the like) associated with the application server. The NEF may associate (e.g., map) the identifier with a service profile associated with a network slice based on a level of service provided by the network slice. The NEF may provide, to a device associated with the application server, information indicating that the identifier is associated with the service profile.

The NEF may receive (e.g., from the device associated with the application server) address information associated with the application server. The NEF may determine that the address information is associated with the service profile based on an identifier associated with the device and/or the application server that is included in the address information. The NEF may associate the address information with the service profile. The NEF may provide service profile information associated with the service profile to a security device included in the core network. The service profile information may include an identifier associated with the service profile, the identifier, and the address information. The NEF may provide the service profile information to the security device to enable the security device to control a level of service provided to downlink traffic from the application server. For example, the security device may forward traffic transmitted by the application server toward a destination via the network slice based on the service profile information.

In this way, some implementations described herein permit dynamic, service-based network slicing for both uplink traffic and downlink traffic. Additionally, by providing the identifier associated with the service profile, rather than NSSAI, the service provider may enable an entity to provide differentiated service to multiple devices accessing services provided by the entity without exposing information related to a network topology of the network to the entity.

Figure 1B:
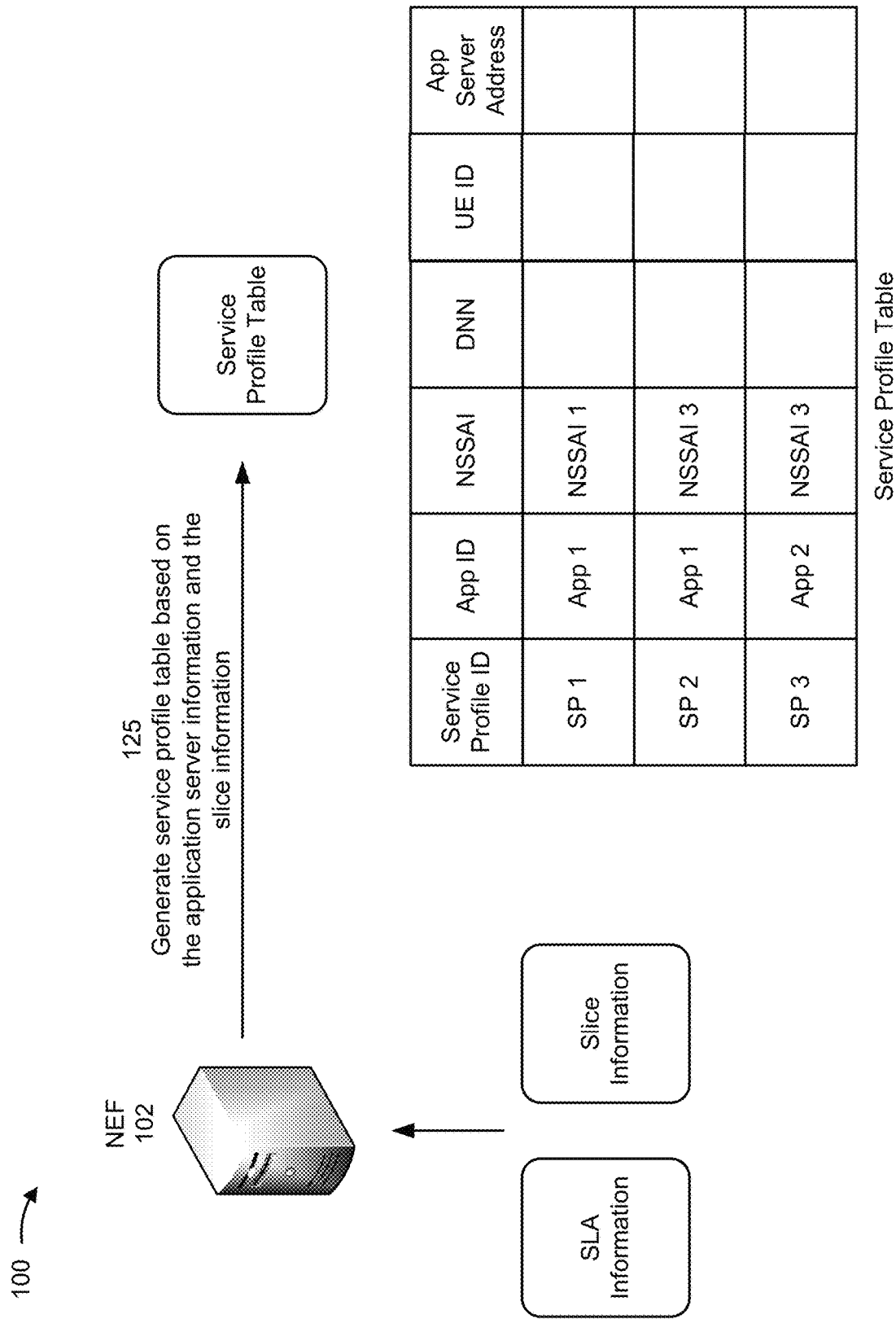
Figure 1C:
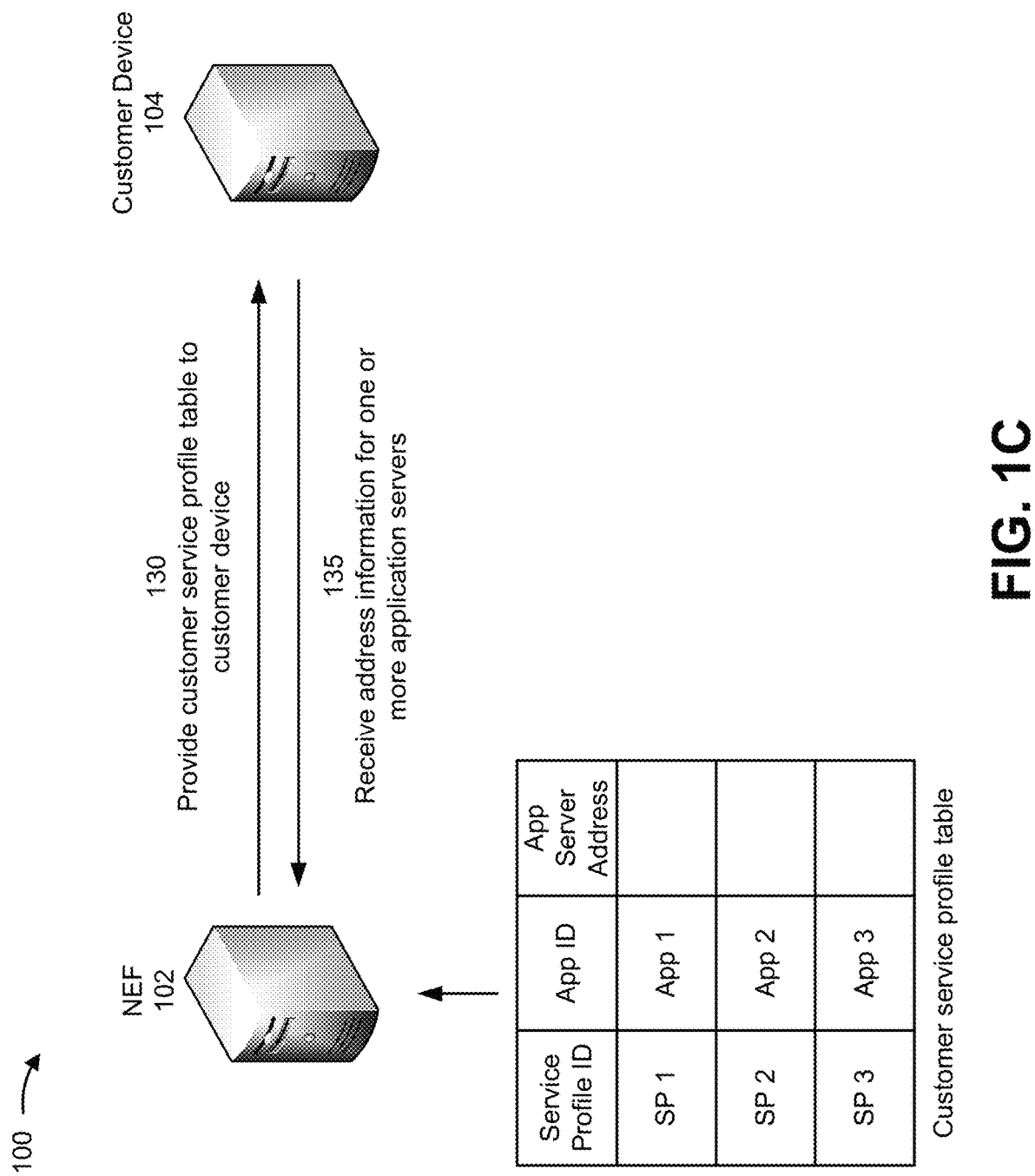
Figure 1D:
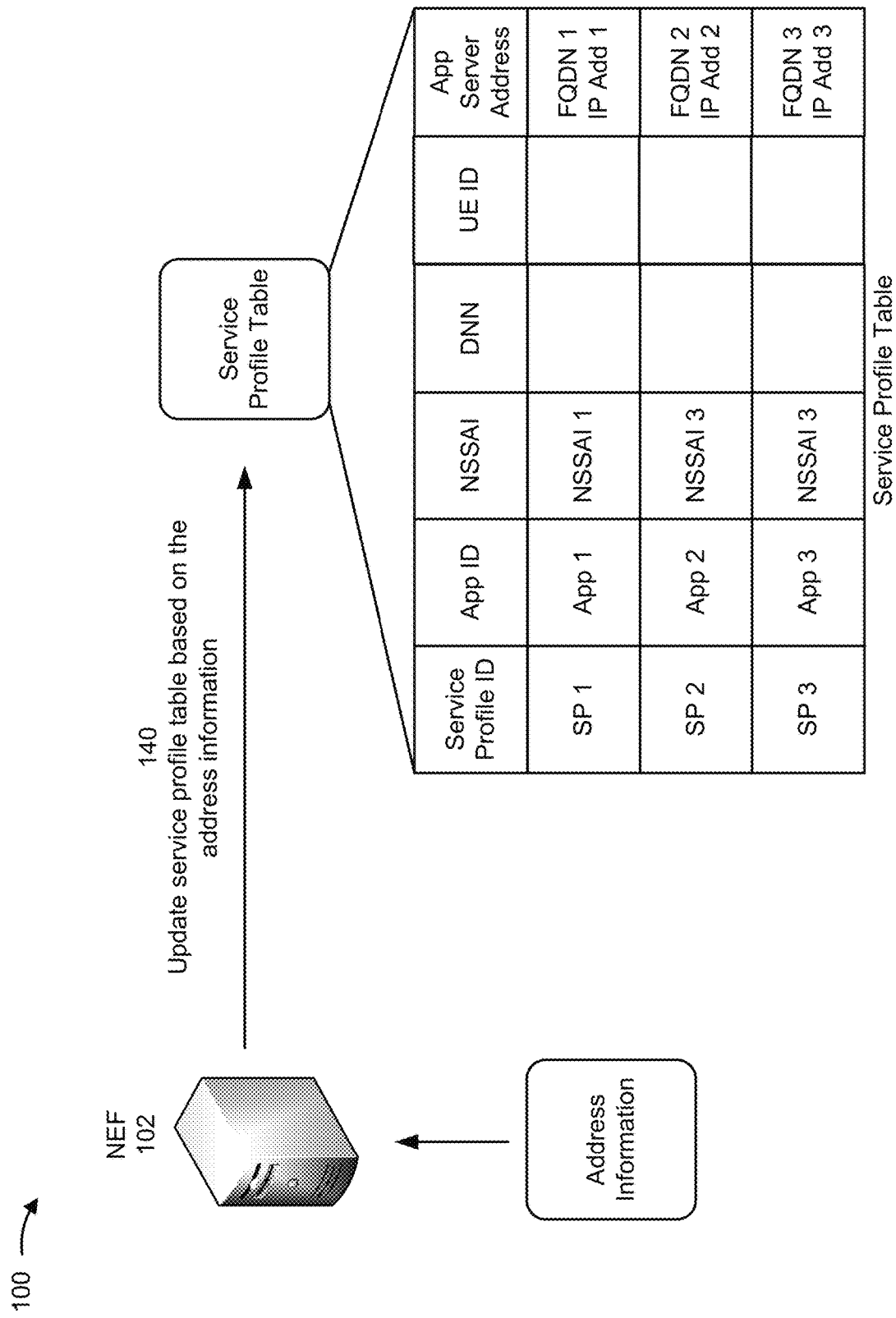
Figure 1F:
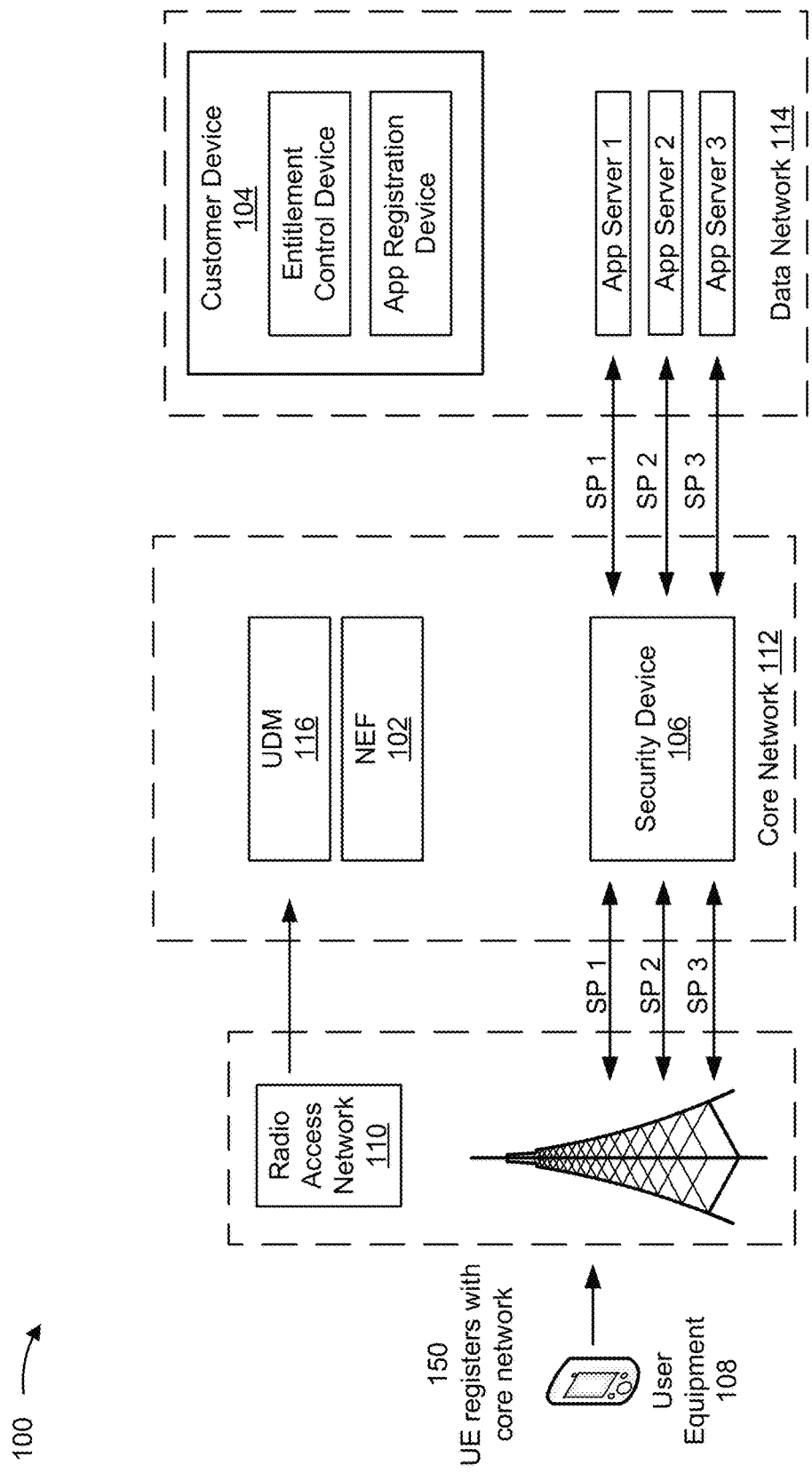

FIGS. 1A-1H are diagrams of an example 100 associated with network based dynamic network slice selection control and federation. As shown in FIGS. 1A-1H, example 100 includes a network exposure function (NEF) 102, a customer device 104, a security device 106, a UE 108, a unified data management (UDM) component 116, and a set of application servers (e.g., App Servers 1 through 3, as shown in FIG. 1F) associated with a radio access network (RAN) 110, a core network 112, and a data network 114. The NEF 102, the customer device 104, the security device 106, the UE 108, the UDM component 116, the set of application servers, the RAN 110, the core network 112, and the data network 114 are described in greater detail below.

As shown in FIG. 1A, and by reference number 120, the NEF 102 receives application server information associated with an application server and slice information associated with a group of network slices. The application server information may include a customer identifier associated with a customer of a service provider associated with the NEF 102 and/or the core network 112, an application server identifier associated with the application server, service level information indicating a level of service (e.g., a basic level of service and/or a premium level of service (e.g., a level of service associated with a higher quality of service, a lower latency, a higher redundancy, and/or the like relative to the basic level of service), among other examples) associated with the application server and/or the customer, and/or the like.

In some implementations, the NEF 102 receives the application server information from a server device associated with the service provider based on the customer subscribing for a service. In some implementations, the service is associated with providing differentiated service to users of a service and/or an application provided via the application server. Alternatively, and/or additionally, the service may be associated with providing the customer (e.g., the application service) with a particular level of service.

The network slice information may include information identifying a plurality of network slices associated with the core network 112, information identifying a respective level of service associated with the plurality of network slices, and/or the like. In some implementations, the NEF 102 receives the network slice information based on receiving the application server information.

For example, the NEF 102 may request the network slice information from a network device included in the core network 112, may obtain the network slice information from a data structure stored in a memory associated with the NEF 102, and/or the like based on receiving the application server information. Alternatively, and/or additionally, the NEF 102 may periodically receive the network slice information and/or may receive the network slice information based on an occurrence of an event (e.g., a creation of a new network slice, a modification to a network slice, and/or the like).

As shown in FIG. 1B, and by reference number 125, the NEF 102 generates a service profile table based on the application server information and the slice information. The NEF 102 may determine one or more levels of service to be provided to the application server based on the application server information. The NEF 102 may associate each level of service, of the one or more levels of service to be provided to the application server with a respective service profile identifier. For a service profile identifier, the NEF 102 may identify, based on the network slice information, a network slice associated with providing the level of service associated with the service profile identifier. The NEF 102 may determine an NSSAI associated with the network slice and may associate the NSSAI with the service profile identifier. The NEF 102 may generate the service profile table based on storing the service profile identifier in association with an identifier associated with the application server and the NSSAI in a data structure.

In some implementations, as shown in FIG. 1B, the data structure includes a table having a plurality of rows and a plurality of columns. Each row may be associated with a respective service profile identifier. For example, as shown in FIG. 1B, a first row of the table is associated with a first service profile identifier (e.g., SP 1, as shown), a second row of the table is associated with a second service profile identifier (e.g., SP 2, as shown), and a third row of the table is associated with a third service profile identifier (e.g., SP 3, as shown).

Each column may be associated with respective types of profile information. For example, as shown in FIG. 1B, a first column of the table is associated with the service profile identifiers. A second column of the table may be associated with respective identifiers of the application servers associated with the service profile identifiers. A third column of the table may be associated with respective NSSAIs associated with the service profile identifiers.

In some implementations, the table may include one or more additional columns. For example, the table may include a fourth column associated with information identifying a respective data network associated with the application servers associated with each application service profile. Alternatively, and/or additionally, the table may include a fifth column associated with information identifying one or more UEs authorized to access the application servers associated with the application server profiles. Alternatively, and/or additionally, the table may include a sixth column associated with information identifying an address (e.g., a fully qualified domain name (FQDN), an internet protocol (IP) address, and/or the like) associated with the application servers associated with the service profile identifiers.

As shown in FIG. 1C, and by reference number 130, the NEF 102 provides a customer service profile table to the customer device 104. The customer device 104 may include a network device included in a data network associated with a customer. The customer service profile table may include information identifying the service profile identifier associated with each application server of the customer. In some implementations, the NEF 102 generates the customer service profile table based on a portion of the service profile table. For example, the NEF 102 may identify a group of one or more application servers associated with a customer and may generate a customer service profile table that includes information mapping each application server to a respective service profile identifier associated with each application server.

In some implementations, the customer service profile table includes address information associated with an application server. For example, the application server information may include information identifying an address of an application server. The NEF 102 may store the address in the service profile table in association with a service profile identifier associated with the application server. The NEF 102 may include the address of the application server in the customer service profile table based on the address being associated with the service profile identifier.

In some implementations, the NEF 102 provides the customer service profile table to the customer device 104 via a request. In some implementations, the request includes a request for address information associated with an application server identified in the customer service profile table. In some implementations, the customer service profile table includes address information for an application server and the request includes a request for verification of the address information.

The customer device 104 may receive the customer service profile table and/or the request from the NEF 102. The customer device 104 may store the customer service profile table in a data structure associated with the customer device 104 and/or an application server identified in the customer service profile. The customer device 104 may provide address information associated with an application server identified in the customer service profile table based on receiving the customer service profile table and/or the request.

The address information may include an address associated with the application server and/or information verifying an address associated with the application server that is included in the customer service profile table. As shown by reference number 135, the NEF 102 receives address information for one or more application servers from the customer device 104.

As shown in FIG. 1D, and by reference number 140, the NEF 102 updates the service profile table based on the address information. The NEF 102 may update the service profile table based on storing the address information for an application server in association with the service profile identifier associated with the application server.

In some implementations, the NEF 102 updates the service profile table based on validating the address information associated with an application server. As an example, the address information may include an IP address associated with the application server. The NEF 102 may tokenize the IP address (e.g., using a dot delimiter, based on one or more colons included in the IP address, and/or the like) to generate a plurality of substrings. The NEF 102 may determine whether a substring includes a non-numeric character. The NEF 102 may determine that the IP address is not valid when a substring includes a non-numeric character. The NEF 102 may determine if a number in each token is within a range of values (e.g., within a range of values from 0 through 255). The NEF 102 may determine that the IP address is not valid when a number is not within the range of values. The NEF 102 may determine whether the IP address includes one or more attributes. For example, the NEF 102 may determine whether the IP address includes a particular bit value (e.g., a 32-bit value, a 128-bit value, three dots, 7 colons, four parts, eight parts, and/or the like). The NEF 102 may determine that the IP address is not valid when the IP address does not include the one or more attributes. The NEF 102 may determine that the IP address is valid when no substring does not include a non-numeric character, when each number is within the range of values, and when the IP address includes the one or more characteristics.

As shown in FIG. 1E, and by reference number 145, the NEF 102 provides customer profile data to the security device 106 associated with the core network 112. The customer profile data may include service profile information associated with a particular customer. For example, as shown in FIG. 1E, the customer profile data includes a customer identifier associated with a customer, an identifier associated with each application server associated with the customer, network slice information (e.g., an NSSAI, as shown) associated with each application server, and address information for each application server.

The NEF 102 may provide the customer profile data to the security device 106 to enable the security device 106 to control traffic to and/or from the application server based on a level of service associated with the application server. For example, the security device 106 may utilize the customer profile data to identify a network slice associated with traffic received from an application server. The security device 106 may forward the traffic received from the application server toward a destination (e.g., UE 108) via the identified network slice. In this way, the security device 106 may control traffic associated with an application server in accordance with a level of service associated with the application server.

As shown in FIG. 1F, and by reference number 150, the UE 108 registers with the core network 112. The UE 108 may wirelessly connect to the RAN 110 at a base station, which is connected to the data network 114 via the core network 112. The UE 108 may run an application that involves communicating with the data network 114 (e.g., an application server included in the data network 114), and therefore the UE 108 may enter into a communication session (e.g., a PDU session) with the data network 114 via the RAN 110 and the core network 112. The UE 108 and the core network 112 may communicate application-specific data during the communication session. In some implementations, to permit the UE 108 to enter into the communication session with the data network 114, the UE 108 may send an initial request to register with the core network 112.

Figure 1G:
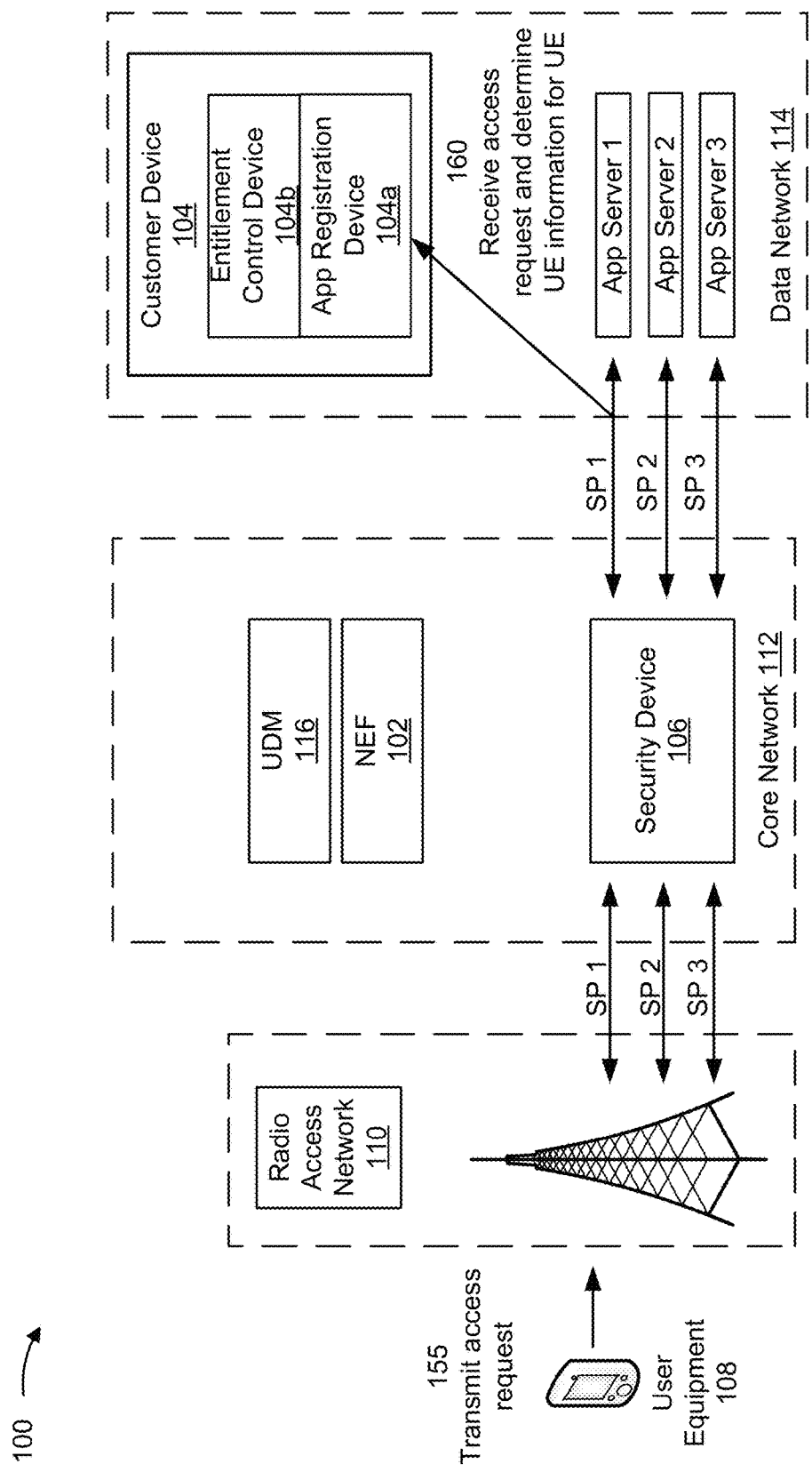

As shown in FIG. 1G, and by reference number 155, the UE 108 transmits an access request to the customer device 104. The UE 108 may transmit an access request associated with accessing an application server associated with the customer device 104. The UE 108 may transmit the access request to the customer device 104 via a network slice associated with a default level of service.

As shown by reference number 160, the customer device 104 (e.g., an application registration device 104*a*, as shown in FIG. 1G) receives the access request and determines UE information for the UE 108. The UE information may include an identifier associated with the UE 108, an identifier of an application server the UE 108 is authorized to access, and subscription information (e.g., a level of service) associated with the UE 108.

Figure 1H:
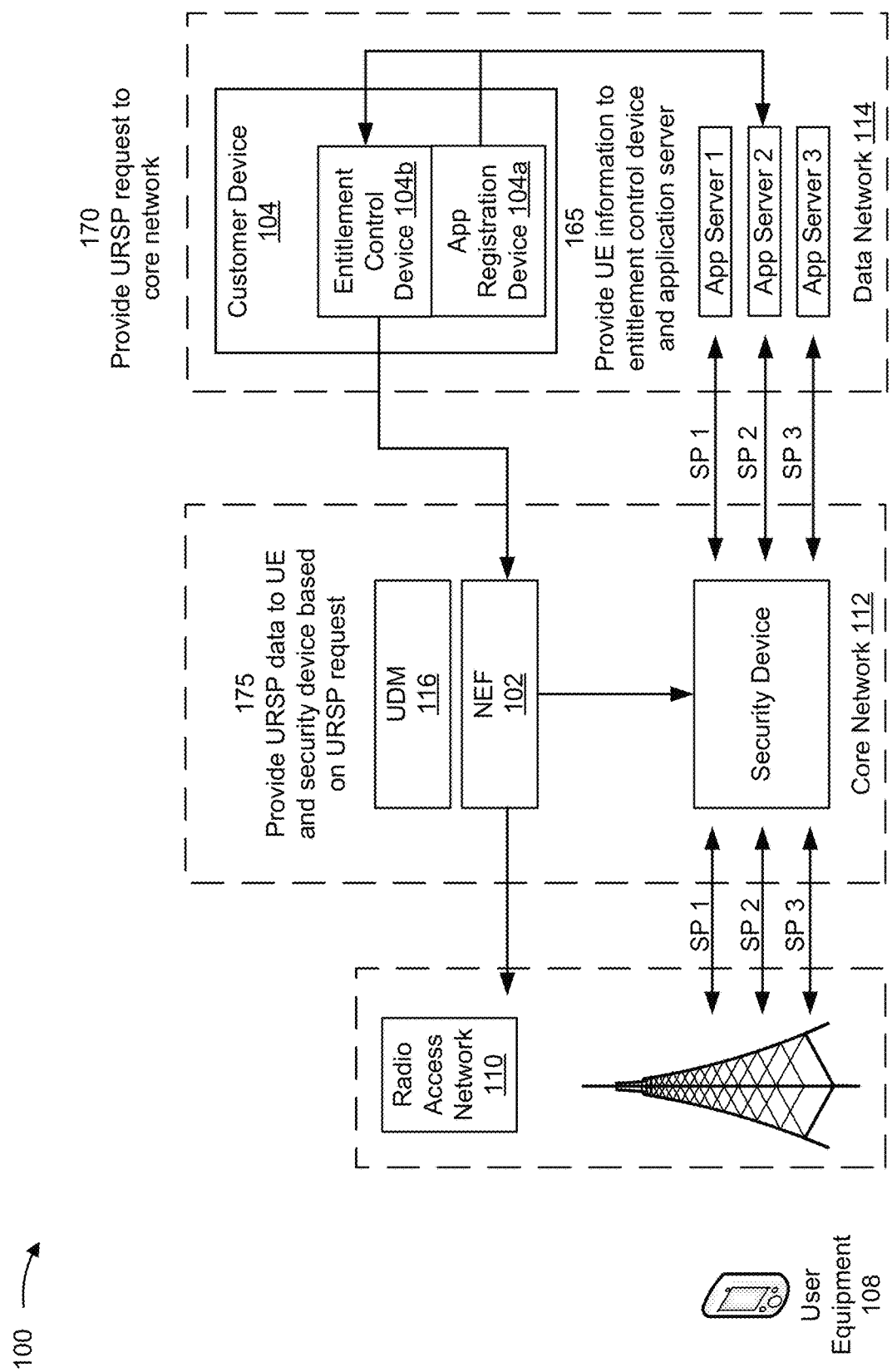

As shown in FIG. 1H, and by reference number 165, the application registration device 104*a* provides the UE information to an entitlement control device 104*b* and an application server. The application registration device 104*a* may provide the UE information to the application server to enable the application server to associate usage information associated with the UE 108 accessing the application server with the UE 108 (e.g., with a user associated with the UE 108). The application server may associate the usage information with the UE 108 as part of a billing process, to monitor a usage of the application server by the UE 108, and/or the like.

The entitlement control device 104*b* may receive the UE information from the application registration device 104*a*. In some implementations, as shown in FIG. 1G, the entitlement control device 104*b* is a component of the customer device 104. In some implementations, the entitlement control device 104*b* is included in another device included in the data network 114. In some implementations, the entitlement control device 104*b* is included in the core network 112. For example, the entitlement control device may be co-located with the NEF 102.

The entitlement control device 104*b* may determine the application server to be accessed by the UE 108 and/or a level of service associated with the UE 108 based on the UE information. The entitlement control device 104*b* may determine a service profile identifier associated with the application server and/or the level of service. The entitlement control device 104b may generate a user equipment route selection policy (URSP) request based on the service profile identifier, an identifier associated with the UE 108, and/or an identifier associated with the application server.

As shown by reference number 170, the entitlement control device 104b provides the URSP request to the core network 112 (e.g., the NEF 102). The URSP request may include the service profile identifier, the identifier associated with the application server, and/or the identifier associated with the UE 108. The NEF 102 may determine a service profile associated with the URSP request based on the service profile identifier. For example, the NEF 102 may identify a service profile associated with the service profile identifier based on the service profile table.

In some implementations, the NEF 102 stores the identifier associated with the UE 108 in the service profile table in association with the service profile identifier. In some implementations, the URSP request includes an identifier associated with a data network associated with the application server. The NEF 102 may store the identifier associated with the data network in the service profile table in association with the service profile identifier.

In some implementations, the NEF 102 identifies a network slice associated with the URSP request and/or the application server based on the service profile identifier. For example, the service profile table may include information associating a network slice associated with the service profile identifier and/or the application server.

The NEF 102 may generate URSP data based on the network slice associated with the service profile identifier and/or the application server. The URSP data may include an NSSAI associated with the network slice, the identifier associated with the application server, and information identifying the data network associated with the application server (e.g., data network 114).

As shown by reference number 175, the NEF 102 provides URSP data to the UE 108 (e.g., via the RAN 110) and the security device 106 based on the URSP request. The UE 108 may utilize the URSP data to access the application server via the network slice.

The security device 106 may update the customer profile data associated with the application server based on the information included in the URSP request. For example, the security device 106 may update the customer profile data associated with the application server by associating the identifier associated with the UE 108 with the customer profile data. The security device 106 may process traffic transmitted between the UE 108 and the application server in accordance with a level of service indicated by the customer profile data.

In some implementations, the NEF 102 associates the service profile identifier associated with the application server with another network slice. The NEF 102 may provide updated customer profile data to the security device 106 based on associating the service profile identifier with the other network slice. The updated customer profile data may include information indicating that the application server is associated with the other network slice.

Subsequently, the NEF 102 may receive another URSP request associated with another UE 108 from the entitlement control device 104b. The URSP request may include the service profile identifier, the identifier associated with the application server, and/or a device identifier associated with the other UE 108. The NEF 102 may determine that the URSP request is associated with the service profile based on the service profile identifier. The NEF 102 may identify the other network slice based on the service profile. The NEF 102 may provide, to the other UE 108 and based on receiving the URSP request, an NSSAI associated with the other network slice, the identifier associated with the application server, and information identifying a data network associated with the application server (e.g., the data network 114) to cause the other UE 108 to transmit traffic to the application server via the other network slice. In this way, the NEF 102 may modify a topology of the network, utilize different network slices, and/or the like in a manner that is transparent to the customer device 104 and/or the UE 108.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
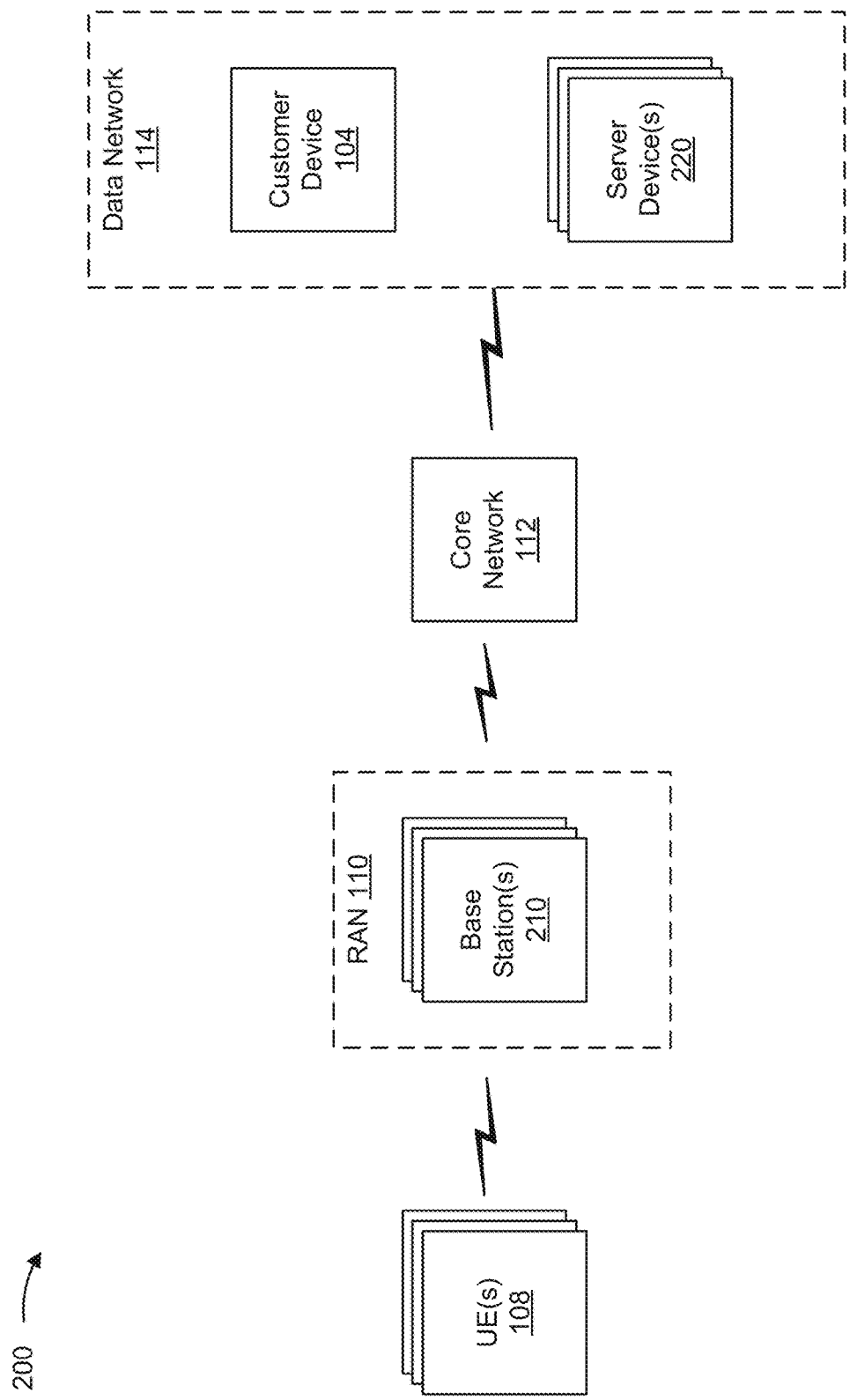
FIG. 2 is a diagram of an example environment in which systems and/or methods described herein may be implemented.

FIG. 2 is a diagram of an example environment 200 in which systems and/or methods described herein can be implemented. As shown in FIG. 2, environment 200 can include a UE 108, a RAN 110, a base station 210, a core network 112, a customer device 104, a server device 220, and a data network 114. Devices of environment 200 can interconnect via wired connections, wireless connections, or a combination of wired and wireless connections.

The UE 108 can include one or more devices capable of communicating with base station 210 and/or a network (e.g., data network 114). For example, the UE 108 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. The UE 108 can be capable of communicating using uplink (e.g., UE to base station) communications, downlink (e.g., base station to UE) communications, and/or sidelink (e.g., UE-to-UE) communications. In some implementations, the UE 108 can include a machine-type communication (MTC) UE, such as an evolved or enhanced MTC (eMTC) UE. In some implementations, the UE 108 can include an Internet of Things (IoT) UE, such as a narrowband IoT (NB-IoT) UE and/or the like.

The RAN 110 can include a base station and be operatively connected, via a wired and/or wireless connection, to the core network 112. The RAN 110 can facilitate communication sessions between UEs and data network 114 by communicating application-specific data between the RAN 110 and core network 112. The data network 114 can include various types of data networks, such as the Internet, a third-party services network, an operator services network, a private network, a wide area network, and/or the like.

The base station 210 includes one or more devices capable of communicating with the UE 108 using a cellular radio access technology (RAT). For example, the base station 210 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. The base station 210 can transfer traffic between the UE 108 (e.g., using a cellular RAT), other base stations 210 (e.g., using a wireless interface or a backhaul interface, such as a wired backhaul interface), and/or the data network 114. The base station 210 can provide one or more cells that cover geographic areas. Some base stations 210 can be mobile base stations. Some base stations 210 can be capable of communicating using multiple RATs.

In some implementations, the base station 210 can perform scheduling and/or resource management for UEs 108 covered by the base station 210 (e.g., UEs 108 covered by a cell provided by base station 210). In some implementations, the base stations 210 can be controlled or coordinated by a network controller, which can perform load balancing, network-level configuration, and/or the like. The network controller can communicate with the base stations 210 via a wireless or wireline backhaul. In some implementations, the base station 210 can include a network controller, a self-organizing network (SON) module or component, or a similar module or component. In other words, a base station 210 can perform network control, scheduling, and/or network management functions (e.g., for other base stations 210 and/or for uplink, downlink, and/or sidelink communications of UEs 108 covered by the base station 210). In some implementations, the base station 210 can include a central unit and multiple distributed units. The central unit can coordinate access control and communication with regard to the multiple distributed units. The multiple distributed units can provide UEs 108 and/or other base stations 210 with access to data network 114.

The core network 112 can include various types of core network architectures, such as a 5G New Generation (NG) Core (e.g., core network 300 of FIG. 3), a Long-Term Evolution (LTE) EPC, and/or the like. In some implementations, the core network 112 can be implemented on physical devices, such as a gateway, a mobility management entity, and/or the like. In some implementations, the hardware and/or software implementing the core network 112 can be virtualized (e.g., through the use of network function virtualization and/or software-defined networking), thereby allowing for the use of composable infrastructure when implementing the core network 112. In this way, networking, storage, and compute resources can be allocated to implement the functions of the core network 112 in a flexible manner as opposed to relying on dedicated hardware and software to implement these functions.

The customer device 104 includes one or more devices capable of receiving, generating, storing, processing, providing, and/or routing information, as described elsewhere herein. The customer device 104 may include a communication device and/or a computing device. For example, the customer device 104 may include a server, such as an application server, a client server, a web server, a database server, a host server, a proxy server, a virtual server (e.g., executing on computing hardware), or a server in a cloud computing system. In some implementations, the customer device 104 includes computing hardware used in a cloud computing environment.

The server device 220 includes one or more devices capable of receiving, generating, storing, processing, providing, and/or routing information associated with providing an application and/or a service to a UE 108, as described elsewhere herein. The server device 220 may include a communication device and/or a computing device. For example, the server device 220 may include a server, such as an application server, a client server, a web server, a database server, a host server, a proxy server, a virtual server (e.g., executing on computing hardware), or a server in a cloud computing system. In some implementations, the server device 220 includes computing hardware used in a cloud computing environment.

The data network 114 includes one or more wired and/or wireless data networks. For example, the data network 114 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
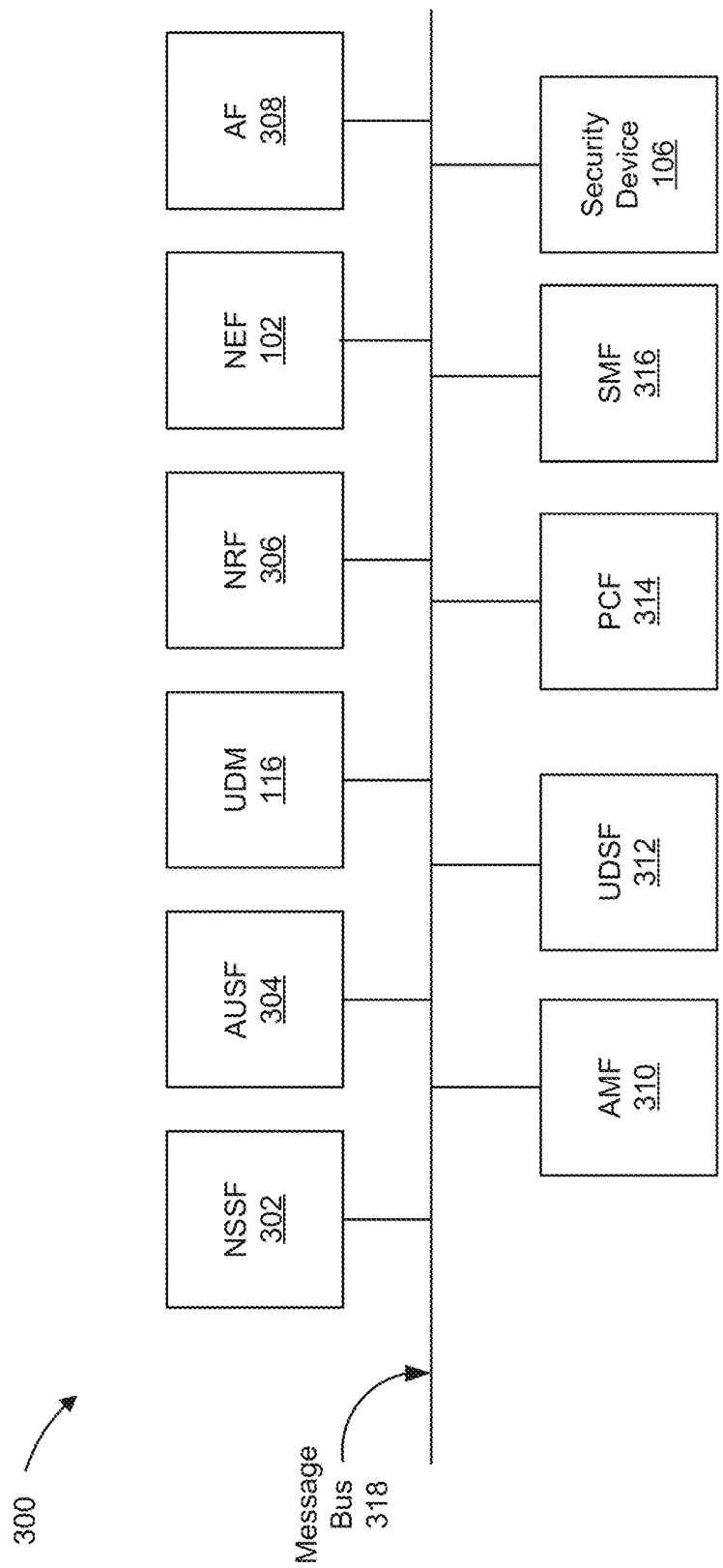
FIG. 3 is a diagram of an example functional architecture of an example core network described herein.

FIG. 3 is a diagram of an example functional architecture of a core network 300 (e.g., core network 112) in which systems and/or methods, described herein, can be implemented. For example, FIG. 3 can show an example functional architecture of a 5G NG core network included in a 5G wireless telecommunications system. In some implementations, the example functional architecture can be implemented by a core network (e.g., core network 112 of FIG. 2) and/or one or more devices (e.g., a device described with respect to FIG. 4). While the example functional architecture of core network 300 shown in FIG. 3 can be an example of a service-based architecture, in some implementations, core network 300 can be implemented as a reference-point architecture.

As shown in FIG. 3, core network 300 can include a number of functional elements. The functional elements can include, for example, a network slice selection function (NSSF) 302, an authentication server function (AUSF) 304, a UDM component 116, a Network Resource Function (NRF) 306, an NEF 102, an application function (AF) 308, an access and mobility management function (AMF) 310, an unstructured data storage function (UDSF) 312, a policy control function (PCF) 314, a Session Management Function (SMF) 316, a message bus 318, and a security device 106. These functional elements can be communicatively connected via a message bus 318, which can be comprised of one or more physical communication channels and/or one or more virtual communication channels. Each of the functional elements shown in FIG. 3 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system.

NSSF 302 can select network slice instances for UEs, where NSSF 302 can determine a set of network slice policies to be applied at the RAN 110. By providing network slicing, NSSF 302 allows an operator to deploy multiple substantially independent end-to-end networks potentially with the same infrastructure. In some implementations, each slice can be customized for different services. NEF 102 can support the exposure of capabilities and/or events in the wireless telecommunications system to help other entities in the wireless telecommunications system discover network services and/or utilize network resources efficiently.

AUSF 304 can act as an authentication server and support the process of authenticating UEs in the wireless telecommunications system. UDM component 116 can store subscriber data and profiles in the wireless telecommunications system. UDM component 116 can be used for fixed access, mobile access, and/or the like, in core network 112. PCF 314 can provide a policy framework that incorporates network slicing, roaming, packet processing, mobility management, and/or the like.

AF 308 can determine whether UEs provide preferences for a set of network slice policies and support application influence on traffic routing, access to NEF 102, policy control, and/or the like. AMF 310 can provide authentication and authorization of UEs and mobility management. UDSF 312 includes one or more data structures configured to store information, mappings, and/or the like associated with the core network 300.

SMF 316 can support the establishment, modification, and release of communication sessions in the wireless telecommunications system. For example, SMF 316 can configure traffic steering policies at a user plane function (UPF) of the core network, enforce UE IP address allocation and policies, and/or the like. AMF 310 and SMF 316 can act as a termination point for Non-Access Stratum (NAS) signaling, mobility management, and/or the like. SMF 316 can act as a termination point for session management related to NAS. The RAN 110 can send information (e.g., the information that identifies the UE) to AMF 310 and/or SMF 316 via PCF 314.

The security device 106 may include one or more devices capable of processing and/or transferring traffic transmitted between devices (e.g., UE 108, customer device 104, server device 220, and/or the like). Additionally, or alternatively, the security device 106 may include one or more devices capable of generating, storing, and/or processing information received and/or provided over a network. For example, the security device 106 may include a firewall, a router, a gateway, a switch, a hub, a bridge, a reverse proxy, a server (e.g., a proxy server), an intrusion detection device, a load balancer, two or more distributed devices, a virtual machine of a cloud computing environment, or the like.

Message bus 318 represents a communication structure for communication among the functional elements. In other words, message bus 318 can permit communication between two or more functional elements. Message bus 318 can be a message bus, HTTP/2 proxy server, and/or the like.

The number and arrangement of functional elements shown in FIG. 3 are provided as an example. In practice, there can be additional functional elements, fewer functional elements, different functional elements, or differently arranged functional elements than those shown in FIG. 3. Furthermore, two or more functional elements shown in FIG. 3 can be implemented within a single device, or a single functional element shown in FIG. 3 can be implemented as multiple, distributed devices. Additionally, or alternatively, a set of functional elements (e.g., one or more functional elements) of core network 300 can perform one or more functions described as being performed by another set of functional elements of core network 300.

Figure 4:
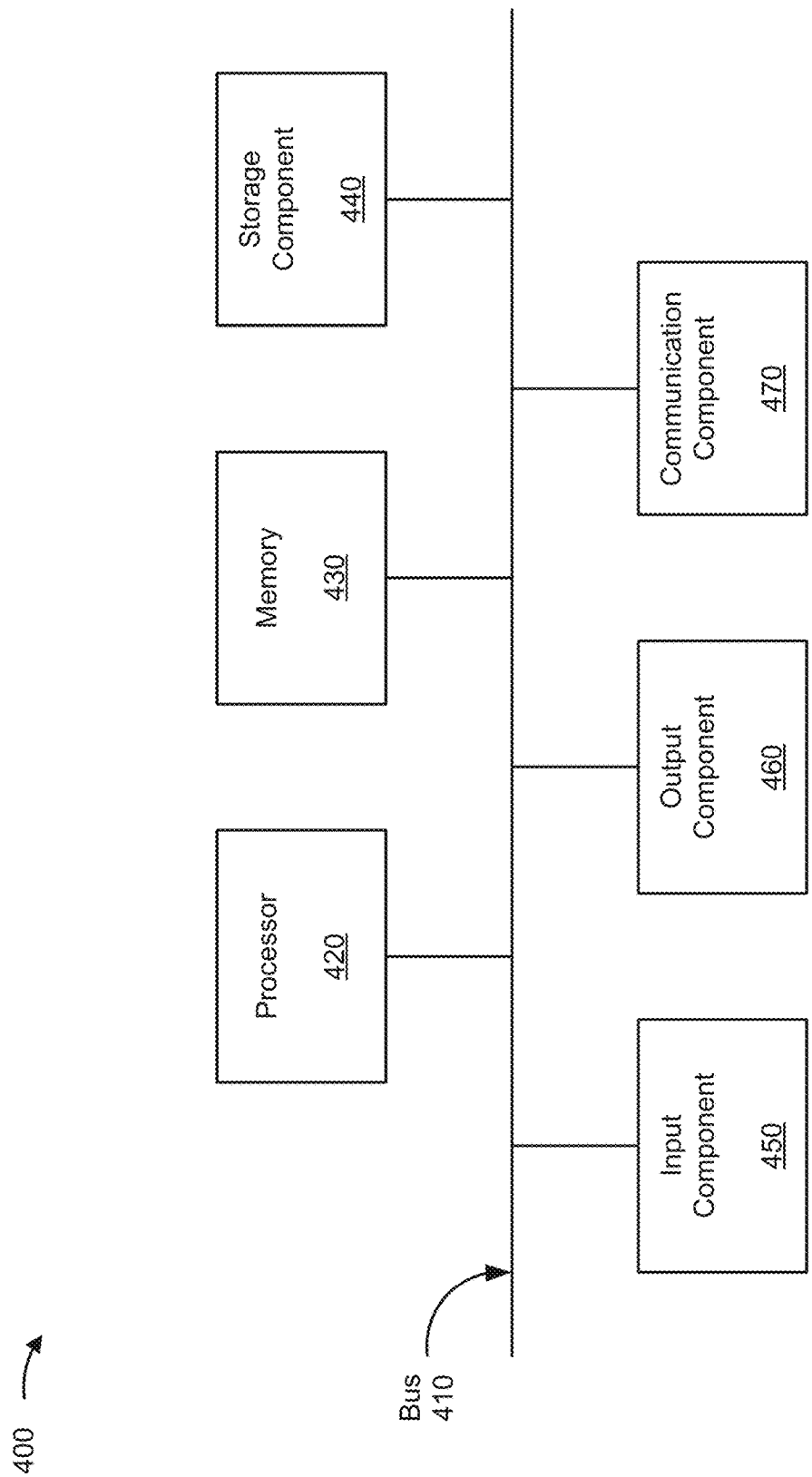
FIG. 4 is a diagram of example components of one or more devices of FIGS. 2 and 3.

FIG. 4 is a diagram of example components of a device 400, which may correspond to NEF 102, customer device 104, security device 106, UE 108, UDM component 116, base station 210, server device 220, NSSF 302, AUSF 304, NRF 306, AF 308, AMF 310, UDSF 312, PCF 314, and/or SMF 316. In some implementations, NEF 102, customer device 104, security device 106, UE 108, UDM component 116, base station 210, server device 220, NSSF 302, AUSF 304, NRF 306, AF 308, AMF 310, UDSF 312, PCF 314, and/or SMF 316 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with network based dynamic network slice selection control and federation. In some implementations, one or more process blocks of FIG. 5 may be performed by a network device (e.g., NEF 102). In some implementations, one or more process blocks of FIG. 5 may be performed by another device or a group of devices separate from or including the network device, such as a customer device (e.g., customer device 104), a security device (e.g., security device 106), and/or a UE (e.g., UE 108). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving an identifier associated with an application server (block 510). For example, the network device may receive an identifier associated with an application server, as described above. In some implementations, the network device may include an NEF included in a core network of a service provider.

As further shown in FIG. 5, process 500 may include associating the identifier with a service profile associated with a network slice (block 520). For example, the network device may associate the identifier with a service profile associated with a network slice based on a quality of service associated with the network slice, as described above.

As further shown in FIG. 5, process 500 may include providing, to a device associated with the application server, information indicating that the identifier is associated with the service profile (block 530). For example, the network device may provide, to a device associated with the application server, information indicating that the identifier is associated with the service profile, as described above.

As further shown in FIG. 5, process 500 may include receiving address information associated with the application server (block 540). For example, the network device may receive address information associated with the application server based on providing the information indicating that the identifier is associated with the service profile, as described above. The address information may include an FQDN, an IP address, and/or the like associated with the application server.

As further shown in FIG. 5, process 500 may include associating the address information with the service profile (block 550). For example, the network device may associate the address information with the service profile, as described above.

As further shown in FIG. 5, process 500 may include providing service profile information to a security device included in a core network (block 560). For example, the network device may provide service profile information to a security device included in a core network of the service provider, as described above. In some implementations, the service profile information includes an identifier associated with the service profile, the identifier, and the address information. In some implementations, the service profile information is provided to the security device to cause the security device to forward traffic transmitted by the application server toward a destination via the network slice.

In some implementations, the service profile information indicates an association between a network slice subnet instance, the identifier, and a network address, wherein the network slice subnet instance is associated with the network slice, and wherein the network address is included in the address information.

In some implementations, the network device receives a URSP request associated with a UE. The URSP request may include the identifier associated with the application server and a device identifier associated with the user equipment. The network device may determine that the URSP request is associated with the service profile based on the identifier. The network device may identify the network slice based on the service profile. The network device may provide, to the UE and based on receiving the URSP request, a network slice subnet instance associated with the network slice, the identifier associated with the application server, and information identifying a data network associated with the application server.

In some implementations, the network device may associate the service profile with another network slice. The network device may provide updated service profile information to the security device based on associating the service profile with the other network slice. The updated service profile information may include information indicating that the service profile is associated with the other network slice.

Subsequently, the network device may receive an URSP request associated with a UE. The URSP request may include the identifier associated with the application server and a device identifier associated with the UE. The network device may determine that the URSP request is associated with the service profile based on the identifier. The network device may identify the other network slice based on the service profile. The network device may provide, to the UE and based on receiving the URSP request, a network slice subnet instance associated with the other network slice, the identifier associated with the application server, and information identifying a data network associated with the application server to cause the UE to transmit traffic to the application server via the other network slice.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, an identifier associated with an application server;
   associating, by the network device, the identifier with a service profile associated with a network slice based on a quality of service associated with the network slice;
   providing, by the network device and to a device associated with the application server, information indicating that the identifier is associated with the service profile;
   receiving, by the network device, address information associated with the application server based on providing the information indicating that the identifier is associated with the service profile;
   associating, by the network device, the address information with the service profile; and
   providing, by the network device, service profile information to a security device included in a core network of a service provider,
   wherein the service profile information is provided to the security device to cause the security device to forward traffic transmitted by the application server toward a destination via the network slice.

2. The method of claim 1, wherein the service profile information includes an identifier associated with the service profile, the identifier associated with the application server, and the address information, and indicates an association between a network slice subnet instance, the identifier associated with the application server, and a network address,
   wherein the network slice subnet instance is associated with the network slice, and
   wherein the network address is included in the address information.

3. The method of claim 1, further comprising:
   receiving a user equipment route selection policy (URSP) request associated with a user equipment,
   wherein the URSP request includes the identifier associated with the application server and a device identifier associated with the user equipment;
   determining that the URSP request is associated with the service profile based on the identifier associated with the application server;
   identifying the network slice based on the service profile; and
   providing, to the user equipment and based on receiving the URSP request, a network slice subnet instance associated with the network slice, the identifier associated with the application server, and information identifying a data network associated with the application server.

4. The method of claim 3, further comprising:
   providing, to the security device, data indicating that the device identifier is associated with one or more of:
   the service profile,
   the network slice subnet instance,
   the identifier associated with the application server, or
   the address information,
   wherein the data is provided to the security device to cause the security device to forward traffic transmitted between the application server and the user equipment via the network slice subnet instance.

5. The method of claim 1, wherein the network device includes a network exposure function associated with the core network.

6. The method of claim 1, further comprising:
   associating the service profile with another network slice; and
   providing updated service profile information to the security device based on associating the service profile with the other network slice,
   wherein the updated service profile information includes information indicating that the service profile is associated with the other network slice.

7. The method of claim 6, further comprising:
   receiving a user equipment route selection policy (URSP) request associated with a user equipment,
   wherein the URSP request includes the identifier associated with the application server and a device identifier associated with the user equipment;

determining that the URSP request is associated with the service profile based on the identifier associated with the application server;

identifying the other network slice based on the service profile; and providing, to the user equipment and based on receiving the URSP request, a network slice subnet instance associated with the other network slice, the identifier associated with the application server, and information identifying a data network associated with the application server.

8. A network device, comprising:
one or more processors configured to:
receive an identifier associated with an application server;
map the identifier with a service profile associated with a network slice based on a quality of service associated with the network slice;
provide, to a device associated with the application server, information indicating that the identifier is mapped to the service profile;
receive address information associated with the application server based on providing the information indicating that the identifier is mapped to the service profile;
associate the address information with the service profile; and
provide service profile information to a security device included in a core network of a service provider,
wherein the service profile information is provided to the security device to cause the security device to forward traffic transmitted by the application server toward a destination via the network slice.

9. The network device of claim 8, wherein the service profile information includes an identifier associated with the service profile, the identifier associated with the application server, and the address information, and indicates an association between a network slice subnet instance associated with the network slice, the identifier associated with the application server, and a network address included in the address information.

10. The network device of claim 8, wherein the one or more processors are further configured to:
receive a user equipment route selection policy (URSP) request associated with a user equipment,
wherein the URSP request includes the identifier associated with the application server and a device identifier associated with the user equipment;
determine that the URSP request is associated with the service profile based on the identifier associated with the application server;
identify the network slice based on the service profile; and
provide, to the user equipment and based on receiving the URSP request, a network slice subnet instance associated with the network slice, the identifier associated with the application server, and information identifying a data network associated with the application server.

11. The network device of claim 10, wherein the one or more processors are further configured to:
provide, to the security device, data indicating that the device identifier is associated with one or more of:
the service profile,
the network slice subnet instance,
the identifier associated with the application server, or
the address information,
wherein the data is provided to the security device to cause the security device to forward traffic transmitted between the application server and the user equipment via the network slice subnet instance.

12. The network device of claim 8, wherein the network device includes a network exposure function associated with the core network.

13. The network device of claim 8, wherein the one or more processors are further configured to:
associate the service profile with another network slice; and
provide updated service profile information to the security device based on associating the service profile with the other network slice,
wherein the updated service profile information includes information indicating that the service profile is associated with the other network slice.

14. The network device of claim 13, wherein the one or more processors are further configured to:
receive a user equipment route selection policy (URSP) request associated with a user equipment,
wherein the URSP request includes the identifier associated with the application server and a device identifier associated with the user equipment;
determine that the URSP request is associated with the service profile based on the identifier associated with the application server;
identify the other network slice based on the service profile; and
provide, to the user equipment and based on receiving the URSP request, a network slice subnet instance associated with the other network slice, the identifier associated with the application server, and information identifying a data network associated with the application server.

15. A non-transitory computer-readable medium storing a set of instructions, the set of instructions comprising:
one or more instructions that, when executed by one or more processors of a network device, cause the network device to:
receive an identifier associated with an application server;
map the identifier to service profile associated with a network slice based on a quality of service associated with the network slice;
provide, to a device associated with the application server, information indicating that the identifier is mapped to the service profile;
receive address information associated with the application server based on providing the information indicating that the identifier is mapped to the service profile;
associate the address information with the service profile; and
provide service profile information to a security device included in a core network of a service provider,
wherein the service profile information is provided to the security device to cause the security device to forward traffic transmitted by the application server toward a destination via the network slice.

16. The non-transitory computer-readable medium of claim 15, wherein the service profile information includes an identifier associated with the service profile, the identifier associated with the application server, and the address information, and includes information indicating an association between a network slice subnet instance associated with the network slice, the identifier, and a network address included in the address information.

17. The non-transitory computer-readable medium of claim 15, wherein the one or more instructions further cause the network device to:
    receive a user equipment route selection policy (URSP) request associated with a user equipment,
        wherein the URSP request includes the identifier associated with the application server and a device identifier associated with the user equipment;
    determine that the URSP request is associated with the service profile based on the identifier associated with the application server;
    identify the network slice based on the service profile; and
    provide, to the user equipment and based on receiving the URSP request, a network slice subnet instance associated with the network slice, the identifier associated with the application server, and information identifying a data network associated with the application server.

18. The non-transitory computer-readable medium of claim 17, wherein the one or more instructions further cause the network device to:
    provide, to the security device, data indicating that the device identifier is associated with one or more of:
        the service profile,
        the network slice subnet instance,
        the identifier associated with the application server, or
        the address information,
    wherein the one or more instructions further cause the network device to forward traffic transmitted between the application server and the user equipment via the network slice subnet instance.

19. The non-transitory computer-readable medium of claim 15, wherein the one or more instructions further cause the network device to:
    associate the service profile with another network slice; and
    provide updated service profile information to the security device based on associating the service profile with the other network slice,
        wherein the updated service profile information includes information indicating that the service profile is associated with the other network slice.

20. The non-transitory computer-readable medium of claim 19, wherein the one or more instructions further cause the network device to:
    receive a user equipment route selection policy (URSP) request associated with a user equipment,
        wherein the URSP request includes the identifier associated with the application server and a device identifier associated with the user equipment;
    determine that the URSP request is associated with the service profile based on the identifier associated with the application server;
    identify the other network slice based on the service profile; and
    provide, to the user equipment and based on receiving the URSP request, a network slice subnet instance associated with the other network slice, the identifier associated with the application server, and information identifying a data network associated with the application server.

\* \* \* \* \*